United States Patent (10) Patent No.: US 8,935,062 B2
Inagaki et al. (45) Date of Patent: Jan. 13, 2015

(54) VEHICLE TRANSMISSION DEVICE

(75) Inventors: Nobuaki Inagaki, Nishio (JP); Hiroya Ueno, Anjo (JP); Shigekazu Hase, Nishio (JP); Nobuhiro Iwai, Anjo (JP); Hiroshi Tsutsui, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 294 days.

(21) Appl. No.: 13/576,768

(22) PCT Filed: Mar. 28, 2011

(86) PCT No.: PCT/JP2011/057557
§ 371 (c)(1),
(2), (4) Date: Aug. 2, 2012

(87) PCT Pub. No.: WO2011/122533
PCT Pub. Date: Oct. 6, 2011

(65) Prior Publication Data
US 2012/0290163 A1 Nov. 15, 2012

(30) Foreign Application Priority Data
Mar. 30, 2010 (JP) ................................. 2010-076713

(51) Int. Cl.
*G06F 7/00* (2006.01)
*G06F 17/00* (2006.01)
(Continued)

(52) U.S. Cl.
CPC . *B60L 11/14* (2013.01); *B60K 6/48* (2013.01); *B60L 7/18* (2013.01); *B60W 10/02* (2013.01);
(Continued)

(58) Field of Classification Search
USPC .......... 701/22, 51, 61, 67, 70, 78, 83, 84, 87; 477/34, 35, 36, 39, 40, 50, 132, 135, 477/139, 140, 144, 166, 169, 170
See application file for complete search history.

(56) References Cited

U.S. PATENT DOCUMENTS

2002/0091035 A1 7/2002 Monowa et al.
2003/0186778 A1* 10/2003 Yamamoto et al. ............... 477/5
(Continued)

FOREIGN PATENT DOCUMENTS

JP A-04-370464 12/1992
JP A-09-303542 11/1997
(Continued)

OTHER PUBLICATIONS

International Search Report issued in International Application No. PCT/JP2011/057557 dated May 10, 2012 (with translation).

*Primary Examiner* — Dalena Tran
*Assistant Examiner* — Jaime Figueroa
(74) *Attorney, Agent, or Firm* — Oliff PLC

(57) ABSTRACT

A vehicle transmission device includes an input member coupled to a combustion engine and a rotary electric machine; an output member coupled to wheels; a speed change mechanism with a plurality of friction engagement elements and that provides a plurality of shift speeds; and a control device that controls the speed change mechanism. When a during-regeneration downshift is performed while the rotary electric machine is outputting regenerative torque, the control device sets a target increase capacity, which is a target value of a transfer torque capacity of an engagement-side element to be engaged after an increase, increases the transfer torque capacity of the engagement-side element to the target increase capacity over a predetermined torque capacity increase period, and decreases a transfer torque capacity of a disengagement-side element, which is to be disengaged, over a predetermined torque capacity decrease period that at least partially overlaps the torque capacity increase period.

12 Claims, 6 Drawing Sheets

(51) Int. Cl.
  *G06F 19/00* (2011.01)
  *B60L 11/14* (2006.01)
  *B60K 6/48* (2007.10)
  *B60L 7/18* (2006.01)
  *B60W 10/02* (2006.01)
  *B60W 10/08* (2006.01)
  *B60W 10/115* (2012.01)
  *B60W 20/00* (2006.01)
  *B60W 30/18* (2012.01)
  *F16H 61/06* (2006.01)

(52) U.S. Cl.
  CPC ............. *B60W 10/08* (2013.01); *B60W 10/115* (2013.01); *B60W 20/00* (2013.01); *B60W 30/18127* (2013.01); *F16H 61/06* (2013.01); *Y02T 10/6221* (2013.01); *Y02T 10/7077* (2013.01); *Y02T 10/7258* (2013.01); *B60Y 2200/92* (2013.01); *B60Y 2300/18125* (2013.01)

USPC ................... 701/51; 701/61; 701/67; 701/70; 701/78; 701/83; 701/84; 701/87

(56) References Cited

U.S. PATENT DOCUMENTS

| | | | |
|---|---|---|---|
| 2003/0224906 | A1  | 12/2003 | Monowa et al. |
| 2006/0287798 | A1* | 12/2006 | Inoue et al. ...................... 701/70 |
| 2009/0171543 | A1* | 7/2009  | Sato et al. ....................... 701/55 |
| 2009/0171545 | A1* | 7/2009  | Shimizu et al. ................. 701/60 |
| 2009/0319141 | A1* | 12/2009 | Suzuki et al. ................... 701/58 |
| 2010/0173746 | A1* | 7/2010  | Ideshio et al. ................... 477/36 |

FOREIGN PATENT DOCUMENTS

| | | |
|---|---|---|
| JP | A-2007-205514 | 8/2007 |
| JP | A-2008-094332 | 4/2008 |
| JP | A-2008-104306 | 5/2008 |

\* cited by examiner

F I G . 4
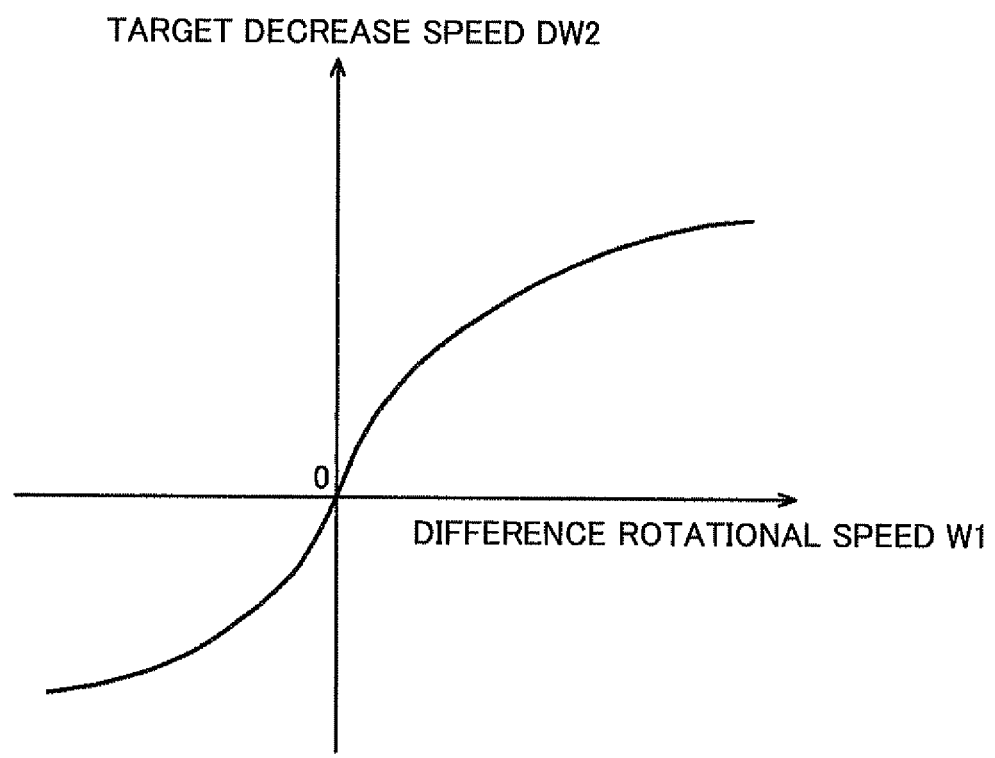

VEHICLE TRANSMISSION DEVICE

INCORPORATION BY REFERENCE

The disclosure of Japanese Patent Application No. 2010-076713 filed on Mar. 30, 2010 including the specification, drawings and abstract is incorporated herein by reference in its entirety.

BACKGROUND OF THE INVENTION

The present invention relates to a vehicle transmission device including an input member drivably coupled to an internal combustion engine and a rotary electric machine, an output member drivably coupled to wheels, a speed change mechanism that provides a plurality of shift speeds established by controlling engagement and disengagement of a plurality of friction engagement elements, and a control device that controls the speed change mechanism.

DESCRIPTION OF THE RELATED ART

A device disclosed in Japanese Patent Application Publication No. JP-A-2008-94332 below, for example, is known as a transmission device for a hybrid vehicle including an internal combustion engine and a rotary electric machine each serving as a drive force source. During deceleration of the vehicle, the transmission device causes the rotary electric machine to output regenerative torque, brakes the vehicle by decelerating the vehicle at a desired deceleration, and recovers kinetic energy as electric energy to improve the fuel efficiency.

In the technology according to Japanese Patent Application Publication No. JP-A-2008-94332, clutch-to-clutch shifting of friction engagement elements is performed when a downshift between shift speeds of the speed change mechanism is performed while the regenerative torque is being output, which temporarily reduces torque that can be transferred by the speed change mechanism. Thus, in the technology according to Japanese Patent Application Publication No. JP-A-2008-94332, the regenerative torque output from the rotary electric machine is temporarily restricted in response to such a reduction in transferable torque, which prevents a reduction in rotational speed input to the speed change mechanism and increases the input rotational speed to shorten the period before completion of the downshift.

SUMMARY OF THE INVENTION

In the technology disclosed in Japanese Patent Application Publication No. JP-A-2008-94332, however, the regenerative torque of the rotary electric machine is restricted when a downshift is performed while the regenerative torque is being output, and therefore the regenerative torque transferred to wheels may be reduced to temporarily reduce a braking force for the vehicle.

In the technology according to Japanese Patent Application Publication No. JP-A-2008-94332, in addition, clutch-to-clutch shifting of friction engagement elements is performed when a downshift is performed, which reduces torque that can be transferred by the speed change mechanism. This does not allow the speed change mechanism to transfer the regenerative torque to the wheels even if the rotary electric machine outputs the regenerative torque without a reduction. Therefore, a sufficient braking force for the vehicle due to the regenerative torque may not be secured when a downshift is performed.

In view of the foregoing, it is desirable to provide a vehicle transmission device that can transfer regenerative torque to wheels without restriction while suppressing a reduction in rotational speed input to a speed change mechanism when a downshift is performed while the regenerative torque is being output.

A first aspect of the present invention provides a vehicle transmission device including an input member drivably coupled to an internal combustion engine and a rotary electric machine, an output member drivably coupled to wheels, a speed change mechanism that includes a plurality of friction engagement elements and that provides a plurality of shift speeds established by controlling engagement and disengagement of the plurality of friction engagement elements, and a control device that controls the speed change mechanism. In the vehicle transmission device, when a during-regeneration downshift is performed by controlling engagement and disengagement of the friction engagement elements while the rotary electric machine is outputting regenerative torque, the control device sets a target increase capacity, which is a target value of a transfer torque capacity of an engagement-side element which is a friction engagement element to be engaged after an increase, in accordance with the regenerative torque, increases the transfer torque capacity of the engagement-side element to the target increase capacity over a predetermined torque capacity increase period, and decreases a transfer torque capacity of a disengagement-side element, which is a friction engagement element to be disengaged, over a predetermined torque capacity decrease period that at least partially overlaps the torque capacity increase period.

The term "speed ratio" as used herein refers to the ratio between the rotational speed of the input member and the rotational speed of the output member defined by the number of teeth of each gear for establishing a shift speed in the case where the shift speed is established in the speed change mechanism. In the present application, the speed ratio is a value obtained by dividing the rotational speed of the input member by the rotational speed of the output member.

Also, the term "drivably coupled" as used herein refers to a state in which two rotary elements are coupled to each other in such a way that allows transfer of a drive force, which includes a state in which the two rotary elements are coupled to each other to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a friction engagement element, a belt, and a chain.

According to the first aspect, the torque capacity increase period, over which the transfer torque capacity of the engagement-side element is increased, and the torque capacity decrease period, over which the transfer torque capacity of the disengagement-side element is decreased, at least partially overlap each other. Thus, the regenerative torque can be transferred to the wheels through both or one of the engagement-side element and the disengagement-side element even during a during-regeneration downshift. Hence, it is possible to prevent occurrence of a period over which no regenerative torque is transferred to the wheels. The target increase capacity, which is a target value of the transfer torque capacity of the engagement-side element after an increase, is set in accordance with the regenerative torque. Thus, the regenerative torque can be appropriately transferred to the wheels even after the friction engagement element which transfers the regenerative torque is shifted from the disengagement-side element to the engagement-side element. Thus, a temporary reduction in braking of the vehicle due to the regenerative torque can be prevented when a during-regeneration downshift is performed, which makes it possible to maintain braking of the vehicle due to the regenerative torque.

In order to complete a downshift, it is necessary to increase the rotational speed of the input member. According to the characteristic configuration, when a during-regeneration downshift is performed, transfer of a drive force between the rotary electric machine and the wheels is secured, and thus the regenerative torque can be hindered from acting as a force for decreasing the rotational speed of the input member, rather than being transferred to the wheels. Hence, a drop in rotational speed of the input member can be suppressed when a during-regeneration downshift is performed, which makes it possible to shorten the period until completion of the downshift.

According to the characteristic configuration, in addition, the regenerative torque transferred by the disengagement-side element can be decreased in an overlapping manner while increasing the regenerative torque transferred by the engagement-side element. This makes it possible to smoothly shift the friction engagement element which transfers the regenerative torque from the disengagement-side element to the engagement-side element in an overlapping manner. Hence, fluctuations in torque to be transferred to the wheels can be suppressed.

According to a second aspect of the present invention, engagement and disengagement of the friction engagement elements may be controlled by a hydraulic pressure of working oil supplied to the friction engagement elements, and the transfer torque capacity may be continuously controlled so as to increase and decrease by controlling the hydraulic pressure.

According to the second aspect, the transfer torque capacity can be continuously varied by controlling the hydraulic pressure supplied to the friction engagement elements. Hence, the regenerative torque transferred to the wheels can be continuously varied during a during-regeneration downshift, which makes it possible to precisely brake the vehicle using the regenerative torque.

According to a third aspect of the present invention, in the case where the disengagement-side element is disengaged, the control device may set the target increase capacity of the engagement-side element to a minimum transfer torque capacity with which the speed change mechanism transfers all the regenerative torque to the output member.

According to the second aspect, a difference in rotational speed (slipping) between the input and output members of the engagement-side element can be caused while transferring all the regenerative torque to the output member via the engagement-side element. Therefore, abrupt variations in rotational speed of the input member due to an abrupt increase in transfer torque capacity of the engagement-side element can be suppressed, and transfer of torque fluctuations due to an abrupt increase in transfer torque capacity of the engagement-side element can be suppressed. Thus, smooth during-regeneration downshift control in which fluctuations in torque to be transferred to the wheels are suppressed can be achieved.

According to a fourth aspect of the present invention, the control device may synchronize a timing to start the predetermined torque capacity decrease period with a timing to start the predetermined torque capacity increase period.

According to the fourth aspect, it is possible to cause the regenerative torque transferred by the engagement-side element to start increasing and cause the regenerative torque transferred by the disengagement-side element to start decreasing at the same time. This makes it possible to start shifting the friction engagement element which transfers the regenerative torque from the disengagement-side element to the engagement-side element while reliably suppressing fluctuations in torque to be transferred to the wheels.

According to a fifth aspect of the present invention, the control device may synchronize a timing to terminate the predetermined torque capacity decrease period with a timing to terminate the predetermined torque capacity increase period.

According to the fifth aspect, it is possible to cause the regenerative torque transferred by the engagement-side element to stop increasing and cause the regenerative torque transferred by the disengagement-side element to stop decreasing at the same time. This makes it possible to finish shifting the friction engagement element which transfers the regenerative torque from the disengagement-side element to the engagement-side element while reliably suppressing fluctuations in torque to be transferred to the wheels.

According to a sixth aspect of the present invention, before start of the predetermined torque capacity decrease period, the control device may decrease the transfer torque capacity of the disengagement-side element to a transfer torque capacity which is larger by a predetermined value than the minimum transfer torque capacity with which the speed change mechanism transfers all the regenerative torque to the output member.

According to the sixth aspect, the transfer torque capacity of the disengagement-side element has been decreased to be close to the minimum transfer torque capacity in advance. Thus, the transfer torque capacity of the disengagement-side element can be decreased from the minimum transfer torque capacity immediately after the start of the torque capacity decrease period, which makes it possible to precisely shift transfer of the regenerative torque to the engagement-side element. Thus, smooth during-regeneration downshift control in which fluctuations in torque to be transferred to the wheels are suppressed can be achieved.

According to a seventh aspect of the present invention, after termination of the predetermined torque capacity increase period, the control device may increase the transfer torque capacity of the engagement-side element from the target increase capacity at a gentler gradient than in the predetermined torque capacity increase period so that a difference in rotational speed between input and output members of the engagement-side element is decreased, and after the difference in rotational speed for the engagement-side element has become a predetermined value or less, the control device may vary the transfer torque capacity of the engagement-side element such that the respective rotational speeds of the input and output members of the engagement-side element are synchronized with each other while decreasing a decrease speed of the difference in rotational speed for the engagement-side element.

According to the seventh aspect, a difference in rotational speed (slipping) between the input and output members of the engagement-side element can be gradually decreased while transferring all the regenerative torque to the output member via the engagement-side element to transition the engagement-side element to the completely engaged state. Thus, transfer of torque fluctuations due to an abrupt increase in transfer torque capacity of the engagement-side element can be suppressed, which makes it possible to achieve smooth during-regeneration downshift control in which fluctuations in torque to be transferred to the wheels are suppressed.

According to the seventh aspect, in addition, the transfer torque capacity of the engagement-side element has been decreased by the time immediately before the engagement-side element is synchronized, and thus torque fluctuations before and after the synchronization can be decreased.

According to an eighth aspect of the present invention, the control device may vary the transfer torque capacity of the engagement-side element in accordance with variations in the regenerative torque.

According to the eighth aspect, even if the regenerative torque varies during execution of a during-regeneration downshift, the transfer torque capacity of the engagement-side element can be varied in accordance with the variations in regenerative torque. Thus, it is possible to maintain a state in which the regenerative torque can be transferred to the output member even in the case where the regenerative torque varies during execution of a during-regeneration downshift.

A ninth aspect of the present invention also provides a vehicle transmission device including an input member drivably coupled to an internal combustion engine and a rotary electric machine, an output member drivably coupled to wheels, a speed change mechanism that includes a plurality of friction engagement elements controlled by a hydraulic pressure of supplied working oil and that provides a plurality of shift speeds established by controlling engagement and disengagement of the plurality of friction engagement elements, and a control device that controls the speed change mechanism. In the vehicle transmission device, when a during-regeneration downshift is performed by controlling engagement and disengagement of the friction engagement elements while the rotary electric machine is outputting regenerative torque, the control device sets a target increase hydraulic pressure, which is a target value of a hydraulic pressure of an engagement-side element which is a friction engagement element to be engaged after an increase, in accordance with the regenerative torque, increases the hydraulic pressure of the engagement-side element to the target increase hydraulic pressure over a predetermined hydraulic pressure increase period, and decreases a hydraulic pressure of a disengagement-side element, which is a friction engagement element to be disengaged, over a predetermined hydraulic pressure decrease period that at least partially overlaps the hydraulic pressure increase period.

According to the ninth aspect, the hydraulic pressure increase period, over which the hydraulic pressure of the engagement-side element is increased, and the hydraulic pressure decrease period, over which the hydraulic pressure of the disengagement-side element is decreased, at least partially overlap each other. Thus, the regenerative torque can be transferred to the wheels through both or one of the engagement-side element and the disengagement-side element even during a during-regeneration downshift. Hence, it is possible to prevent occurrence of a period over which no regenerative torque is transferred to the wheels. The target increase hydraulic pressure, which is a target value of the hydraulic pressure of the engagement-side element after an increase, is set in accordance with the regenerative torque. Thus, the regenerative torque can be appropriately transferred to the wheels even after the friction engagement element which transfers the regenerative torque is shifted from the disengagement-side element to the engagement-side element. Thus, a temporary reduction in braking of the vehicle due to the regenerative torque can be prevented when a during-regeneration downshift is performed, which makes it possible to maintain braking of the vehicle due to the regenerative torque.

In order to complete a downshift, it is necessary to increase the rotational speed of the input member. According to the ninth aspect, when a during-regeneration downshift is performed, transfer of a drive force between the rotary electric machine and the wheels is secured, and thus the regenerative torque can be hindered from acting as a force for decreasing the rotational speed of the input member, rather than being transferred to the wheels. Hence, a drop in rotational speed of the input member can be suppressed when a during-regeneration downshift is performed, which makes it possible to shorten the period until completion of the downshift.

According to the ninth aspect, in addition, the regenerative torque transferred by the disengagement-side element can be decreased in an overlapping manner while increasing the regenerative torque transferred by the engagement-side element. This makes it possible to smoothly shift the friction engagement element which transfers the regenerative torque from the disengagement-side element to the engagement-side element in an overlapping manner. Hence, fluctuations in torque to be transferred to the wheels can be suppressed.

BRIEF DESCRIPTION OF THE DRAWINGS

FIG. 4 is a map for use in the process performed by the control device according to the embodiment of the present invention.

DETAILED DESCRIPTION OF THE EMBODIMENT

Figure 1:
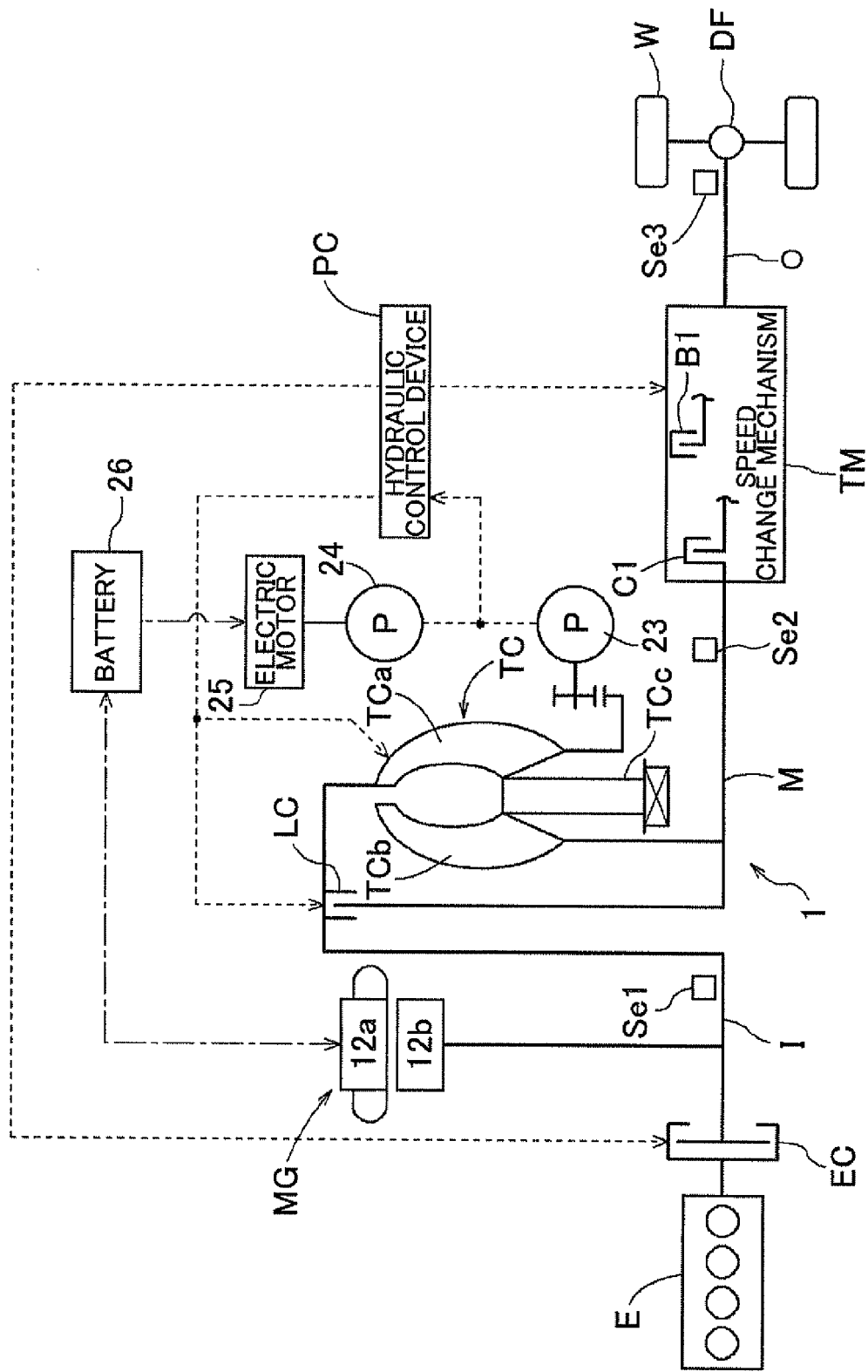
FIG. 1 is a schematic diagram showing the configuration of a vehicle transmission device according to an embodiment of the present invention.

A vehicle transmission device 1 according to an embodiment of the present invention will be described with reference to the drawings. FIG. 1 is a schematic diagram showing the schematic configuration of the vehicle transmission device 1 according to the embodiment. As shown in the drawing, a vehicle incorporating the vehicle transmission device 1 is a hybrid vehicle including both an engine E, which is an internal combustion engine, and a rotary electric machine MG each serving as a drive force source. In the drawing, the solid lines each indicate a drive force transfer path, the broken lines each indicate a working oil supply path, and the dash-dotted line indicates an electric power supply path. As shown in the drawing, the vehicle transmission device 1 according to the embodiment is generally configured to include the engine E and the rotary electric machine MG each serving as a drive force source, and to transfer drive forces of the drive force sources to wheels W via a torque converter TC and a speed change mechanism TM. The vehicle transmission device 1 includes an intermediate shaft M serving as an input member drivably coupled to the engine E and the rotary electric machine MG an output shaft O serving as an output member drivably coupled to the wheels W, the speed change mechanism TM that includes a plurality of friction engagement elements C1, B1, . . . and that provides a plurality of shift speeds established by controlling engagement and disengagement of the plurality of friction engagement elements, and a control device 31 that controls the speed change mechanism TM. The vehicle transmission device 1 also includes a hydraulic control device PC that supplies working oil at a predetermined hydraulic pressure to various components such as the torque converter TC and the speed change mechanism TM. The vehicle transmission device 1 includes an input shaft rotational speed sensor Se1, an intermediate shaft rotational speed sensor Se2, and an output shaft rotational speed sensor Se3 that detect the rotational speed of an input shaft I, the intermediate shaft M, and the output shaft O, respectively.

In such a configuration, the control device 31 according to the embodiment is characterized by control performed when a during-regeneration downshift is performed by controlling engagement and disengagement of the plurality of friction engagement elements while the rotary electric machine MG is outputting regenerative torque Tg. The term "downshift" refers to shifting to a shift speed with a higher speed ratio. That is, when a during-regeneration downshift is to be performed, the control device 31 first sets a target increase capacity Tf, which is a target value of the transfer torque capacity of an engagement-side element which is a friction engagement element to be engaged after an increase, in accordance with the regenerative torque Tg. Next, the control device 31 increases the transfer torque capacity of the engagement-side element to the target increase capacity Tf over a predetermined torque capacity increase period, and decreases the transfer torque capacity of a disengagement-side element, which is a friction engagement element to be disengaged, over a predetermined torque capacity decrease period that at least partially overlaps the torque capacity increase period. The vehicle transmission device 1 and the control device 31 according to the embodiment will be described in detail below.

1. Configuration of Drive/Transfer System of Vehicle Transmission Device

First, the configuration of the drive/transfer system of the vehicle transmission device 1 according to the embodiment will be described. As shown in FIG. 1, the vehicle transmission device 1 serves as a drive device for a hybrid vehicle of a parallel type which includes the engine E and the rotary electric machine MG each serving as a drive force source for driving the vehicle, and in which the engine E and the rotary electric machine MG are drivably coupled to each other in series. Also, the vehicle transmission device 1 includes the torque converter TC and the speed change mechanism TM, which transfer rotation of the engine E and the rotary electric machine MG each serving as a drive force source to the output shaft O while changing the rotational speed and converting torque.

The engine E is an internal combustion engine driven by combustion of fuel. Various engines known in the art such as a gasoline engine and a diesel engine, for example, may be used as the engine E. In the embodiment, an output rotary shaft of the engine E, such as a crankshaft, is drivably coupled to the input shaft I via a transfer clutch EC. This allows the input shaft I to be selectively drivably coupled to the engine E via the transfer clutch EC. The transfer clutch EC is a friction engagement element supplied with working oil at a pressure regulated by the hydraulic control device PC to be engaged or disengaged under control performed by a hydraulic control valve (not shown). It is also suitable that the output rotary shaft of the engine E is drivably coupled to the input shaft I integrally or via other members such as a damper.

The rotary electric machine MG includes a stator 12a fixed to a case (not shown), and a rotor 12b rotatably supported on the radially inner side of the stator 12a. The rotor 12b of the rotary electric machine MG is drivably coupled to the input shaft I so as to rotate together with the input shaft I. That is, in the embodiment, both the engine E and the rotary electric machine MG are drivably coupled to the input shaft I. The rotary electric machine MG is electrically connected to a battery 26 serving as an electricity accumulation device. The rotary electric machine MG can function as a motor (electric motor) that is supplied with electric power to produce power and as a generator (electric generator) that is supplied with power to produce electric power. That is, the rotary electric machine MG performs power running using electric power supplied from the battery 26, or generates electric power using a rotational drive force transferred from the engine E or the wheels W to accumulate the generated electric power in the battery 26. The battery 26 is an example of the electricity accumulation device. Other types of electricity accumulation devices such as a capacitor may be used, or a plurality of types electricity accumulation devices may be used in combination. Hereinafter, electric power generation performed by the rotary electric machine MG is referred to as "regeneration", and negative torque output from the rotary electric machine MG during electric power generation is referred to as "regenerative torque Tg".

In the vehicle transmission device 1, during deceleration of the vehicle, the transfer clutch EC is disengaged, the engine E is stopped, and a lock-up clutch LC of the torque converter TC is engaged. Then, the rotary electric machine MG is allowed to output the regenerative torque Tg while generating electric power using a rotational drive force transferred from the wheels W.

The torque converter TC is drivably coupled to the input shaft I. The torque converter TC is a device that transfers the rotational drive force of the input shaft I, which is drivably coupled to the engine E and the rotary electric machine MG each serving as a drive force source, to the speed change mechanism TM via the intermediate shaft M. The torque converter TC includes a pump impeller TCa serving as an input-side rotary member and drivably coupled to the input shaft I, a turbine runner TCb serving as an output-side rotary member and drivably coupled to the intermediate shaft M, and a stator TCc provided between the pump impeller TCa and the turbine runner TCb and including a one-way clutch. The torque converter TC transfers a drive force between the pump impeller TCa on the driving side and the turbine runner TCb on the driven side via working oil filling the torque converter TC.

Here, the torque converter TC includes the lock-up clutch LC serving as a friction engagement element for lock-up. The lock-up clutch LC is a clutch that couples the pump impeller TCa and the turbine runner TCb so as to rotate together with each other in order to enhance the transfer efficiency by eliminating the difference in rotational speed (slipping) between the pump impeller TCa and the turbine runner TCb. Thus, with the lock-up clutch LC in the engaged state, the torque converter TC directly transfers the drive force of the drive force source (the input shaft I) to the speed change mechanism TM (the intermediate shaft M) not via working oil. In the embodiment, the lock-up clutch LC is basically in the engaged state so that the input shaft I and the intermediate shaft M rotate together with each other. Thus, in the embodiment, the input shaft I and the intermediate shaft M basically rotate at the same rotational speed as each other. The torque converter TC including the lock-up clutch LC is supplied with working oil at a pressure regulated by the hydraulic control device PC.

The speed change mechanism TM is drivably coupled to the intermediate shaft M serving as the output shaft of the torque converter TC. That is, the intermediate shaft M functions as an input shaft of the speed change mechanism TM. The speed change mechanism TM is a stepped automatic transmission that provides a plurality of shift speeds with different speed ratios. In order to establish the plurality of shift speeds, the speed change mechanism TM includes a gear mechanism such as a planetary gear mechanism and the plurality of friction engagement elements B1, C1, . . . . In the example, the plurality of friction engagement elements B1, C1, . . . are each an engagement element such as a clutch and a brake formed to include friction members. Engagement and disengagement of the friction engagement elements B1, C1, . . . are controlled by the hydraulic pressure of working oil supplied to each of the friction engagement elements. The friction engagement elements B1, C1, . . . can be continuously controlled such that the transfer torque capacity of the friction engagement element is increased and decreased by controlling the supplied hydraulic pressure. That is, the transfer torque capacity of the plurality of friction engagement elements B1, C1, . . . is continuously controlled so as to increase and decrease by controlling the hydraulic pressure supplied to each of the friction engagement elements. A wet multi-plate clutch, for example, may be suitably used as the clutch.

A friction engagement element transfers torque between input and output members of the friction engagement element through friction between the input and output members. The term "transfer torque capacity" refers to the magnitude of maximum torque that can be transferred by a friction engagement element through friction. In the case where there is a difference in rotational speed (slipping) between the input and output members of the friction engagement element, torque with a magnitude corresponding to the transfer torque capacity is transferred from a member with a higher rotational speed to a member with a lower rotational speed. In the case where there is no difference in rotational speed (slipping) between the input and output members of the friction engagement element, torque up to the magnitude of the transfer torque capacity is transferred to act on the input and output members of the friction engagement element. The magnitude of the transfer torque capacity varies in proportion to the magnitude of the hydraulic pressure supplied to the friction engagement element.

Each of the friction engagement elements of the speed change mechanism TM includes a return spring, and is urged to be disengaged by the reaction force of the spring. When a force produced by the hydraulic pressure supplied to the friction engagement element exceeds the reaction force of the spring, the friction engagement element starts producing the transfer torque capacity to bring the friction engagement element from the disengaged state into the engaged state. The hydraulic pressure at which the transfer torque capacity starts being produced is referred to as a "stroke end pressure". The friction engagement element is configured such that the transfer torque capacity of the friction engagement element increases in proportion to an increase in hydraulic pressure after the supplied hydraulic pressure exceeds the stroke end pressure.

In FIG. 1, a first clutch C1 and a first brake B1 are schematically shown as examples of the plurality of friction engagement elements. By switching engagement or disengagement of the plurality of friction engagement elements, the rotational state of a plurality of rotary elements of the gear mechanism is switched to switch between shift speeds.

When switching between shift speeds is performed, so-called clutch-to-clutch shifting is performed, that is, one of friction engagement elements that are engaged before the shifting (hereinafter referred to as a "disengagement-side element") is disengaged and one of friction engagement elements that are disengaged before the shifting (hereinafter referred to as a "engagement-side element") is engaged. A case where a downshift is performed will be described below. The downshift is shifting of the shift speed established in the speed change mechanism TM from a lower shift speed with a lower speed ratio (for example, a third shift speed) to a higher shift speed with a high speed ratio (for example, a second shift speed).

The speed change mechanism TM transfers rotation of the intermediate shaft M to the output shaft O while changing the rotational speed with a predetermined speed ratio set for each shift speed and converting torque. The torque transferred from the speed change mechanism TM to the output shaft O is distributed and transferred to the two, left and right, wheels W via a differential device DF. In the embodiment, the vehicle transmission device 1 has a single-axis configuration with the intermediate shaft M and the output shaft O disposed coaxially with each other. In the embodiment, the input shaft I, the intermediate shaft M, and the output shaft O are all disposed coaxially with each other to form a single-axis configuration.

2. Configuration of Hydraulic Control System

Next, the hydraulic control system of the vehicle transmission device 1 discussed above will be described. As shown in FIG. 1, the hydraulic control system includes two types of pumps, namely a mechanical pump 23 and an electric pump 24, each serving as a hydraulic pressure source that sucks working oil accumulated in an oil pan (not shown) to supply working oil to various components of the vehicle transmission device 1. The mechanical pump 23 is drivably coupled to the input shaft I via the pump impeller TCa of the torque converter TC, and driven by a rotational drive force of one or both of the engine E and the rotary electric machine MG. The electric pump 24 is an oil pump that operates on a drive force of an electric motor 25 for driving a pump. The electric motor 25 which drives the electric pump 24 is electrically connected to the battery 26, and produces a drive force using electric power supplied from the battery 26. The electric pump 24 is a pump that assists the mechanical pump 23, and operates when a required amount of oil is not supplied from the mechanical pump 23 such as while the vehicle is stationary or traveling at a low speed.

The hydraulic control system also includes the hydraulic control device PC which adjusts the hydraulic pressure of working oil supplied from the mechanical pump 23 and the electric pump 24 to a predetermined pressure. Although not described in detail here, the hydraulic control device PC adjusts the degree of opening of one or two or more adjustment valves on the basis of a signal pressure from a linear solenoid valve for hydraulic pressure adjustment to adjust the amount of working oil to be drained from the adjustment valves, thereby adjusting the hydraulic pressure of working oil to one or two or more predetermined pressures. Working oil adjusted to a predetermined pressure is supplied to the transfer clutch EC, the lock-up clutch LC, the torque converter TC, and the plurality of friction engagement elements C1, B1, . . . of the speed change mechanism TM at a hydraulic pressure respectively required by the components.

3. Configuration of Control Device

Figure 2:
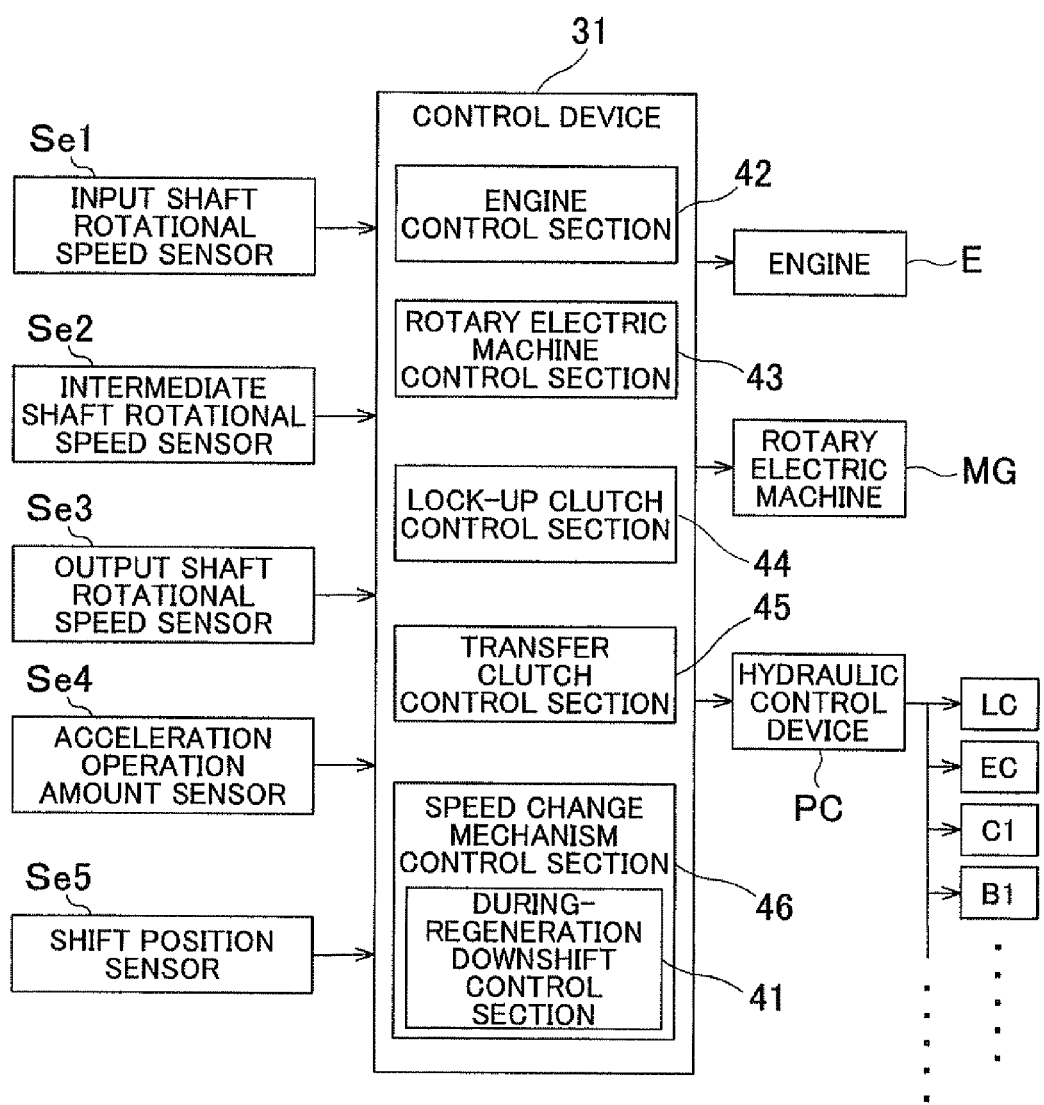
FIG. 2 is a block diagram showing the configuration of a control device according to the embodiment of the present invention.

Next, the configuration of the control device 31 according to the embodiment will be described. As shown in FIG. 2, the control device 31 functions as a core member that controls operations of various components of the vehicle transmission device 1. The control device 31 includes an arithmetic processing unit such as a CPU serving as a core member, a storage device such as a RAM (random access memory) configured to read and write data from and into the arithmetic processing unit and a ROM (read only memory) configured to read data from the arithmetic processing unit, and so forth (not shown). Various functional sections 41 to 46 of the control device 31 are formed by software (a program) stored in the ROM or the like, hardware such as a separately provided arithmetic circuit, or a combination of both. The functional sections 41 to 46 are configured to exchange information between each other.

The vehicle transmission device 1 includes sensors Se1 to Se5 that output an electrical signal to be input to the control device 31. The control device 31 calculates information detected by the various sensors on the basis of the input electrical signal.

The input shaft rotational speed sensor Se1 is a sensor that detects the rotational speed of the input shaft I. The rotor 12*b* of the rotary electric machine MG is integrally drivably coupled to the input shaft I. Thus, the control device 31 calculates the rotational speed of the input shaft I and the rotary electric machine MG from a signal input from the input shaft rotational speed sensor Se1. The intermediate shaft rotational speed sensor Se2 is a sensor that detects the rotational speed of the intermediate shaft M. The control device 31 calculates the rotational speed of the intermediate shaft M from a signal input from the intermediate shaft rotational speed sensor Se2. The output shaft rotational speed sensor Se3 is a sensor that detects the rotational speed of the output shaft O. The control device 31 calculates the rotational speed output from the speed change mechanism TM from a signal input from the output shaft rotational speed sensor Se3. The rotational speed of the output shaft O is proportional to the vehicle speed. Therefore, the control device 31 calculates the vehicle speed from the signal input from the output shaft rotational speed sensor Se3.

An acceleration operation amount sensor Se4 is a sensor that detects the amount of operation of an accelerator pedal operated by a driver to detect the accelerator operation amount. The control device 31 calculates the acceleration operation amount from a signal input from the acceleration operation amount sensor Se4. A shift position sensor Se5 is a sensor that detects the selected position (shift position) of a shift lever. The control device 31 detects which of travel ranges such as a "drive range", a "second range", and a "low range" is designated by the driver on the basis of information input from the shift position sensor Se5.

As shown in FIG. 2, the control device 31 includes an engine control section 42, a rotary electric machine control section 43, a lock-up clutch control section 44, a transfer clutch control section 45, and a speed change mechanism control section 46. The speed change mechanism control section 46 includes a during-regeneration downshift control section 41 as its subordinate functional section. The functional sections 41 to 46 of the control device 31 will be described in detail below.

3-1. Engine Control Section

The engine control section 42 is a functional section that controls an operation of the engine E. The engine control section 42 determines an engine operation point, and controls the engine E so as to operate in accordance with the determined engine operation point. Here, the engine operation point is a control command value indicating a control target point for the engine E, and is defined by a rotational speed and torque. The engine control section 42 controls the engine E so as to operate in accordance with the torque and the rotational speed indicated by the engine operation point. In the embodiment, the engine control section 42 stops supply of fuel to the engine E to control the engine E to a stationary state during regenerative electric power generation such as during deceleration.

3-2. Rotary Electric Machine Control Section

The rotary electric machine control section 43 is a functional section that controls an operation of the rotary electric machine MG. The rotary electric machine control section 43 determines a rotary electric machine operation point, and controls the rotary electric machine MG so as to operate in accordance with the determined rotary electric machine operation point. Here, the rotary electric machine operation point is a control command value indicating a control target point for the rotary electric machine MG, and is defined by a rotational speed and torque. More particularly, the rotary electric machine operation point is a command value indicating the control target point for the rotary electric machine MG determined in consideration of the vehicle required output and the engine operation point, and is defined by a rotational speed command value and a torque command value. The rotary electric machine control section 43 controls the rotary electric machine MG so as to operate in accordance with the torque and the rotational speed indicated by the rotary electric machine operation point. In the embodiment, the rotary electric machine control section 43 sets the torque command value to a negative value during regenerative electric power generation such as during deceleration. This allows the rotary electric machine MG to generate electric power by outputting the regenerative torque Tg in the negative direction while rotating in the positive direction.

3-3. Lock-up Clutch Control Section

The lock-up clutch control section 44 is a functional section that controls the lock-up clutch LC. Here, the lock-up clutch control section 44 controls the hydraulic pressure supplied to the lock-up clutch LC via the hydraulic control device PC to control engagement or disengagement of the lock-up clutch LC. In the embodiment, the lock-up clutch control section 44 controls the lock-up clutch LC to the engaged state during regenerative electric power generation such as during deceleration.

3-4. Transfer Clutch Control Section

The transfer clutch control section 45 is a functional section that controls the transfer clutch EC. Here, the transfer clutch control section 45 controls the hydraulic pressure supplied to the transfer clutch EC via the hydraulic control device PC to control engagement or disengagement of the transfer clutch EC. In the embodiment, the transfer clutch control section 45 controls the transfer clutch EC to the disengaged state during regenerative electric power generation such as during deceleration.

3-5. Speed Change Mechanism Control Section

The speed change mechanism control section 46 is a functional section that controls the speed change mechanism TM. The speed change mechanism control section 46 determines a target shift speed for the speed change mechanism TM on the basis of information detected by the sensors such as the vehicle speed, the acceleration operation amount, and the shift position. The speed change mechanism control section 46 controls the hydraulic pressure supplied to the friction engagement elements provided in the speed change mechanism TM via the hydraulic control device PC to engage or disengage the friction engagement elements in order to establish the target shift speed in the speed change mechanism TM.

The speed change mechanism control section 46 references a speed change map stored in a memory (not shown) to determine the target shift speed. The speed change map is a map defining the relationship between the accelerator operation amount and the vehicle speed, and the target shift speed for the speed change mechanism TM. The speed change map includes a plurality of upshift lines and a plurality of downshift When the vehicle speed and the accelerator operation amount are varied so that an upshift line or a downshift line is crossed on the speed change map, the speed change mechanism control section 46 determines a new target shift speed for the speed change mechanism TM. The target shift speed is also changed in the case where the shift position is changed. For example, the target shift speed may be changed in the case where the shift position is changed to the second range or the low range. Here, the term "upshift" means switching from a shift speed with a higher speed ratio to a shift speed with a lower speed ratio, and the term "downshift" means switching from a shift speed with a lower speed ratio to a shift speed with a higher speed ratio.

The speed change mechanism control section 46 controls the hydraulic pressure supplied to the plurality of friction engagement elements C1, B1, . . . in accordance with the new target shift speed to switch between shift speeds in the speed change mechanism TM. In this event, the speed change mechanism control section 46 disengages the disengagement-side element and engages the engagement-side element. For example, in the case where a downshift is performed, the speed change mechanism control section 46 performs downshift control in which the disengagement-side element, which is one of friction engagement elements for establishing the higher shift speed, is disengaged and the engagement-side element, which is one of friction engagement elements for establishing the lower shift speed, is engaged.

3-6. During-Regeneration Downshift Control Section

The during-regeneration downshift control section 41, which is a subordinate functional section of the speed change mechanism control section 46, is configured to perform a during-regeneration downshift in the case where a downshift is performed with a downshift line crossed because of a reduction in vehicle speed, with a change in shift position, or the like while the rotary electric machine MG is outputting the regenerative torque Tg such as during deceleration of the vehicle.

When a during-regeneration downshift is to be performed, the during-regeneration downshift control section 41 first sets the target increase capacity Tf, which is a target value of the transfer torque capacity of the engagement-side element after an increase, in accordance with the regenerative torque Tg. Next, the during-regeneration downshift control section 41 increases the transfer torque capacity of the engagement-side element to the target increase capacity Tf over a predetermined torque capacity increase period, and decreases the transfer torque capacity of the disengagement-side element, which is a friction engagement element to be disengaged, over a predetermined torque capacity decrease period that at least partially overlaps the torque capacity increase period.

After the termination of the predetermined torque capacity increase period, the during-regeneration downshift control section 41 increases the transfer torque capacity of the engagement-side element from the target increase capacity Tf at a gentler gradient than in the predetermined torque capacity increase period such that the difference in rotational speed between the input and output members of the engagement-side element decreases. After the difference in rotational speed between the input and output members of the engagement-side element becomes a predetermined value or less, the during-regeneration downshift control section 41 varies the transfer torque capacity of the engagement-side element such that the respective rotational speeds of the input member and the output member of the engagement-side element are synchronized with each other while decreasing the decrease speed of the difference in rotational speed between the input and output members of the engagement-side element. In the embodiment described below, regeneration downshift control performed by the during-regeneration downshift control section 41 will be described with reference to FIG. 3.

3-6-1. Pre-Control Phase

Figure 3:
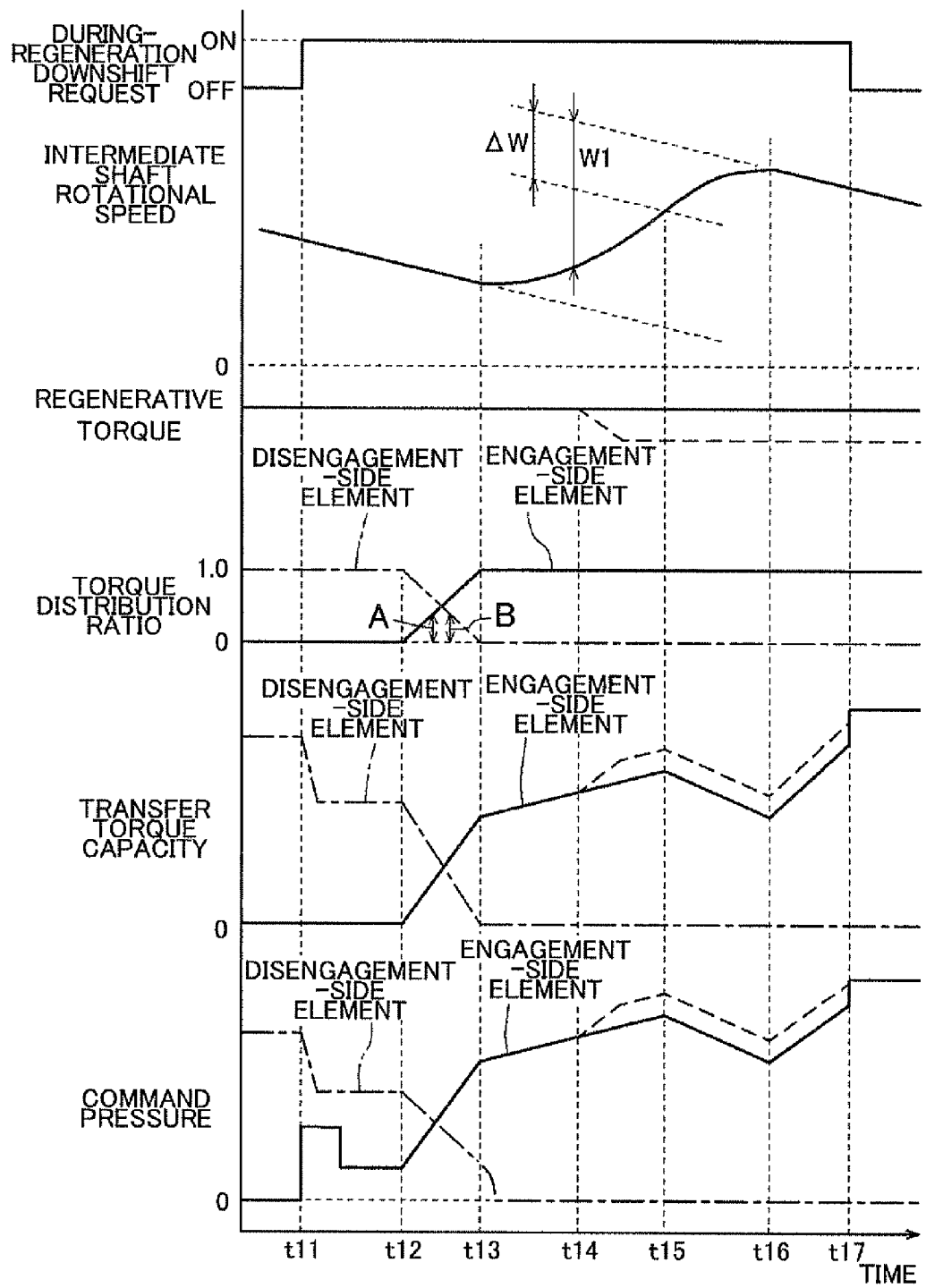
FIG. 3 is a timing chart showing a process performed by the control device according to the embodiment of the present invention.

When a downshift request is made with the target shift speed changed from a higher shift speed to a lower shift speed while the rotary electric machine MG is outputting the regenerative torque Tg such as during deceleration of the vehicle, the during-regeneration downshift control section 41 transitions the control phase from a normal control phase to a pre-control phase (time t11 of FIG. 3).

The pre-control phase is a phase in which the transfer torque capacity of the disengagement-side element and the engagement-side element or the hydraulic pressure supplied to the disengagement-side element or the engagement-side element is varied in advance. By providing the pre-control phase, the control response of the transfer torque capacity of the engagement-side element and the disengagement-side element can be enhanced. This makes it is possible to start decreasing the transfer torque capacity of the disengagement-side element in synchronization with the start of an increase in transfer torque capacity of the engagement-side element. Then, the friction engagement element which transfers the regenerative torque Tg to the wheels W can be shifted from the disengagement-side element to the engagement-side element in an overlapping manner.

In the embodiment, after the transition to the pre-control phase (time t11), the during-regeneration downshift control section 41 starts control for supplying working oil at a predetermined engagement-side preliminary pressure to the engagement-side element in order for the engagement-side element to start producing the transfer torque capacity. The engagement-side preliminary pressure is set to a pressure required to fill a hydraulic cylinder of the engagement-side element with working oil. In the example, the engagement-side preliminary pressure is set to the stroke end pressure at which the friction engagement element starts producing the transfer torque capacity. Then, the during-regeneration downshift control section 41 commands the hydraulic control device PC to supply the engagement-side preliminary pressure as a command pressure, and the hydraulic control device PC supplies the engagement-side element with working oil at the command pressure. In the example, as shown in the example of FIG. 3, after the start of the supply of working oil, the during-regeneration downshift control section 41 momentarily sets the command pressure to be higher than the engagement-side preliminary pressure so as to quickly raise the actual pressure.

After the transition to the pre-control phase, the during-regeneration downshift control section 41 starts control for decreasing the transfer torque capacity of the disengagement-side element to a disengagement-side preliminary capacity set in accordance with the regenerative torque Tg. The disengagement-side preliminary capacity is set to be larger by a predetermined capacity than the minimum transfer torque capacity with which the disengagement-side element can transfer all the regenerative torque Tg to the wheels W.

When the higher shift speed before the downshift is established, all the torque input to the speed change mechanism TM acts on the disengagement-side element via gears for establishing the higher shift speed. Thus, the during-regeneration downshift control section 41 calculates disengagement-side input torque Tif, which is torque acting on the disengagement-side element, on the basis of the input torque and the tooth number ratio of the gears for establishing the higher shift speed. That is, the during-regeneration downshift control section 41 calculates the disengagement-side input torque Tif as a value obtained by multiplying the regenerative torque Tg, which is the input torque, by a disengagement-side transfer ratio Rf calculated on the basis of the tooth number ratio of the gears for establishing the higher shift speed as given by the following formula (1). The disengagement-side input torque Tif is calculated at all times while the during-regeneration downshift control is performed so that the calculated value is reflected in various control.

$$Tif = Tg \times Rf \qquad (1)$$

The during-regeneration downshift control section 41 calculates the minimum transfer torque capacity with which the disengagement-side element can transfer all the disengagement-side input torque Tif to the wheels W through friction between the input and output members of the disengagement-side element. Then, the during-regeneration downshift control section 41 sets the disengagement-side preliminary capacity on the basis of the disengagement-side input torque Tif. In the example, the disengagement-side preliminary capacity is set to a value obtained by adding a predetermined safety value to the magnitude of the disengagement-side input torque Tif. The predetermined safety value is set to a value at which no slipping occurs between the input and output members of the disengagement-side element because of an error factor or a disturbance.

The during-regeneration downshift control section 41 calculates a disengagement-side preliminary hydraulic pressure in accordance with the disengagement-side preliminary capacity, and decreases the hydraulic pressure supplied to the disengagement-side element to the disengagement-side preliminary hydraulic pressure.

The characteristics of the transfer torque capacity and the supplied hydraulic pressure of each of the friction engagement elements is generally calculated on the basis of the friction plate area, the friction coefficient, the piston area, the return spring force, the friction plate radius, and so forth. In the example, the characteristics of the transfer torque capacity and the supplied hydraulic pressure are stored in a map for each of the friction engagement elements, and a conversion from the transfer torque capacity into the supplied hydraulic pressure is performed on the basis of the characteristics map as appropriate.

In the embodiment, in the case where a predetermined pre-control period elapses (time t12) after the start of the pre-control phase, the during-regeneration downshift control section 41 transitions the control phase from the pre-control phase to a torque control phase. The pre-control period is set as a period since the engagement-side preliminary pressure starts being supplied to the engagement-side element until the friction engagement element starts producing the transfer torque capacity, that is, until the actual hydraulic pressure reaches the engagement-side preliminary pressure. Because the viscosity of working oil varies in accordance with variations in oil temperature, the period until the engagement-side preliminary pressure is reached fluctuates in accordance with the oil temperature. In order to adapt to such fluctuations in period, the pre-control period is set in accordance with the oil temperature of working oil.

3-6-2. Torque Control Phase

In the case where the engagement-side element starts producing the transfer torque capacity, the during-regeneration downshift control section 41 transitions the control phase from the pre-control phase to the torque control phase.

In the torque control phase, the torque relationship is transitioned from the state at the higher shift speed to the state at the lower shift speed, but the rotational speed relationship is not varied but maintained in the state at the higher shift speed, with the engagement-side element slipping while transferring torque through friction and the disengagement-side element brought into the disengaged state. That is, in the torque control phase, the rotational speed relationship is not varied but remains in the state at the higher shift speed, and only the torque distribution is transitioned from the state at the higher shift speed to the state at the lower shift speed.

After the start of the torque control phase, the during-regeneration downshift control section 41 sets the target increase capacity Tf, which is a target value of the transfer torque capacity of the engagement-side element after an increase in the torque control phase, in accordance with the regenerative torque Tg.

When the torque control phase is terminated, the torque distribution has been transitioned from the state at the higher shift speed to the state at the lower shift speed, with all the torque input to the speed change mechanism TM acting on the engagement-side element via gears for establishing the lower shift speed. Thus, the during-regeneration downshift control section 41 calculates engagement-side input torque Tie, which is torque acting on the engagement-side element, on the basis of the input torque and the tooth number ratio of the gears for establishing the lower shift speed. That is, the during-regeneration downshift control section 41 calculates the engagement-side input torque Tie as a value obtained by multiplying the regenerative torque Tg, which is the input torque, by an engagement-side transfer ratio Re calculated on the basis of the tooth number ratio of the gears for establishing the lower shift speed as given by the following formula (2):

$$Tie = Tg \times Re \qquad (2)$$

The during-regeneration downshift control section 41 calculates the minimum transfer torque capacity with which the engagement-side element can transfer all the engagement-side input torque Tie to the wheels W through friction between the input and output members of the engagement-side element, and sets the target increase capacity Tf to the resulting value. That is, the target increase capacity Tf is set to the magnitude of the engagement-side input torque Tie as given by the following formula (3):

$$Tf = |Tie| \qquad (3)$$

The engagement-side input torque Tie and the target increase capacity Tf are calculated at all times while the during-regeneration downshift control is performed so that the calculated values are reflected in various control.

The during-regeneration downshift control section 41 increases the transfer torque capacity of the engagement-side element to the target increase capacity Tf over a predetermined torque capacity increase period, and decreases the transfer torque capacity of the disengagement-side element over a predetermined torque capacity decrease period that at least partially overlaps the torque capacity increase period.

In the embodiment, the timing to start the torque capacity decrease period (time t12) is synchronized with the timing to start the torque capacity increase period (time t12), and the timing to terminate the torque capacity decrease period (time t13) is synchronized with the timing to terminate the torque capacity increase period (time t13). That is, the torque capacity increase period (time t12 to time t13) and the torque capacity decrease period (time t12 to time 13) coincide with each other. In addition, the period of the torque control phase coincides with the torque capacity increase period and the torque capacity decrease period.

The during-regeneration downshift control section 41 sets engagement-side distribution regenerative torque Tge, which is a portion of the regenerative torque Tg distributed to the engagement-side element for transfer, to a value obtained by multiplying the regenerative torque Tg by an engagement-side distribution ratio A, and sets disengagement-side distribution regenerative torque Tgr, which is a portion of the regenerative torque Tg distributed to the disengagement-side element for transfer to a value obtained by multiplying the regenerative torque Tg by a disengagement-side distribution ratio B. The disengagement-side distribution ratio B is set such that the total value of the engagement-side distribution ratio A and the disengagement-side distribution ratio B equals 1.0, and such that the total of the engagement-side distribution regenerative torque Tge and the disengagement-side distribution regenerative torque Tgr equals the regenerative torque Tg. Hence, all the regenerative torque Tg is distributed to the engagement-side element and the disengagement-side element to be transferred to the wheels W.

The during-regeneration downshift control section 41 increases the engagement-side distribution ratio A from zero to 1.0 over the torque capacity increase period (the period of the torque control phase). In the embodiment, the engagement-side distribution ratio A is gradually increased at a predetermined first gradient. The predetermined first gradient is set to a value obtained by dividing 1.0 by the torque capacity increase period. Hence, the torque distribution for transfer of the regenerative torque Tg is gradually transitioned from the disengagement-side element to the engagement-side element over the torque capacity increase period (the period of the torque control phase).

The during-regeneration downshift control section 41 controls the transfer torque capacity of the engagement-side element such that the engagement-side element transfers the engagement-side distribution regenerative torque Tge, of all the regenerative torque Tg, to the wheels W. That is, the during-regeneration downshift control section 41 controls the transfer torque capacity of the engagement-side element such that the engagement-side element transfers to the wheels W torque obtained by multiplying the engagement-side input torque Tie by the engagement-side distribution ratio A.

Specifically, the during-regeneration downshift control section 41 sets engagement-side friction transfer torque, which is transferred by the engagement-side element through friction between the input and output members of the engagement-side element, to a value obtained by multiplying the regenerative torque Tg by the engagement-side transfer ratio Re and the engagement-side distribution ratio A as given by the following formula (4), and sets a target transfer torque capacity Tc of the engagement-side element to the magnitude of the engagement-side friction transfer torque.

$$Tc=|Tg \times Re \times A|=|Tie \times A| \quad (4)$$

Then, the during-regeneration downshift control section 41 converts the target transfer torque capacity Tc of the engagement-side element into a target hydraulic pressure on the basis of the characteristics map of the engagement-side element, and supplies working oil at the target hydraulic pressure to the engagement-side element via the hydraulic control device PC. The during-regeneration downshift control section 41 may set the engagement-side friction transfer torque to a value obtained by multiplying the regenerative torque Tg by a predetermined safety factor in addition to the engagement-side transfer ratio Re and the engagement-side distribution ratio A. The predetermined safety factor is set to a minimum value (for example, 1.1) that allows transfer of all the regenerative torque Tg to the wheels W even in the presence of an error factor or a disturbance.

Likewise, the during-regeneration downshift control section 41 controls the transfer torque capacity of the disengagement-side element such that the disengagement-side element transfers the disengagement-side distribution regenerative torque Tgr, of all the regenerative torque Tg, to the wheels W. That is, the during-regeneration downshift control section 41 controls the transfer torque capacity of the disengagement-side element such that the disengagement-side element transfers to the wheels W torque obtained by multiplying the disengagement-side input torque Tif by the disengagement-side distribution ratio B.

Specifically, the during-regeneration downshift control section 41 sets disengagement-side friction transfer torque, which is transferred by the disengagement-side element through friction between the input and output members of the disengagement-side element, to a value obtained by multiplying the regenerative torque Tg by the disengagement-side distribution ratio B and the disengagement-side transfer ratio Rf as given by the following formula (5), and sets a target transfer torque capacity Tr of the disengagement-side element to the magnitude of the disengagement-side friction transfer torque. Then, the during-regeneration downshift control section 41 converts the target transfer torque capacity Tr of the disengagement-side element into a target hydraulic pressure on the basis of the characteristics map of the disengagement-side element, and supplies working oil at the target hydraulic pressure to the disengagement-side element via the hydraulic control device PC.

$$Tr=|Tg \times Rf \times B|=|Tif \times B| \quad (5)$$

3-6-3. Inertia Control Phase

After the transfer torque capacity of the engagement-side element is increased to the target increase capacity Tf, the during-regeneration downshift control section 41 transitions the control phase from the torque control phase to an inertia control phase (time t13).

In the inertia control phase, the transfer torque capacity of the engagement-side element is increased to be larger than the magnitude of the regenerative torque Tg acting via gears so that the transfer torque of the engagement-side element exceeds the regenerative torque Tg. Then, excessive torque, by which the regenerative torque Tg is exceeded, is used to increase the rotational speed of the input member of the engagement-side element to the rotational speed of the output member of the engagement-side element to transition into a state in which there is no difference in rotational speed (slipping) between the input and output members of the engagement-side element. The increase speed of the rotational speed of the input member is proportional to the excessive torque, and inversely proportional to the inertia (inertia moment) of the input member.

In the embodiment, after the start of the inertia control phase, the during-regeneration downshift control section 41 performs control for gradually increasing the transfer torque capacity of the engagement-side element from the target increase capacity Tf at a second gradient set to be smaller in magnitude than the first gradient. The during-regeneration downshift control section 41 sets the target transfer torque capacity Tc of the engagement-side element to a value obtained by adding, to the magnitude of the engagement-side input torque Tie used to set the target increase capacity Tf, a value obtained by multiplying a second gradient K2 and a time T2 having elapsed after the start of the inertia control phase as given by the following formula (6):

$$Tc=|Tie|+K2 \times T2 \quad (6)$$

The during-regeneration downshift control section 41 converts the target transfer torque capacity Tc of the engagement-side element into a target hydraulic pressure on the basis of the characteristics map of the engagement-side element, and supplies working oil at the target hydraulic pressure to the engagement-side element via the hydraulic control device PC.

Excessive torque, by which the transfer torque capacity of the engagement-side element exceeds the magnitude of the engagement-side input torque Tie, is used to increase the rotational speed of the input member (the intermediate shaft M) of the engagement-side element.

Here, since the engagement-side input torque Tie is calculated at all times and varied in accordance with variations in regenerative torque Tg as described above, the target transfer torque capacity Tc is also varied in accordance with variations in regenerative torque Tg. For example, in the case where the magnitude of the regenerative torque Tg is increased and decreased as indicated by the broken line at and after time t14 in FIG. 3, the target transfer torque capacity of the engagement-side element is increased and decreased in accordance with the increase and decrease in magnitude of the regenerative torque Tg.

When the rotational speed of the intermediate shaft M is increased and a difference rotational speed W1, which is a difference in rotational speed calculated by subtracting the rotational speed of the intermediate shaft M from the target input rotational speed at the lower shift speed, becomes a predetermined value ΔW or less (time t15), the during-regeneration downshift control section 41 transitions to feedback control in which the rotational speed of the intermediate shaft M and the target input rotational speed at the lower shift speed are synchronized with each other while decreasing a target decrease speed DW2 of the difference rotational speed W1. Specifically, the during-regeneration downshift control section 41 performs feedback control of the transfer torque capacity of the engagement-side element so as to decrease the target decrease speed DW2 of the difference rotational speed W1 as the difference rotational speed W1 decreases such that the target decrease speed DW2 of the difference rotational speed W1 becomes zero when the difference rotational speed W1 becomes zero.

Here, the target input rotational speed at the lower shift speed is the rotational speed of the intermediate shaft M at which the rotational speed of the input member of the engagement-side element coincides with the rotational speed of the output member of the engagement-side element so that there is no difference in rotational speed (slipping) between the input and output members of the engagement-side element. The difference rotational speed W1 for the intermediate shaft M is proportional to the difference in rotational speed between the input and output members of the engagement-side element. The target input rotational speed at the lower shift speed is a rotational speed obtained by multiplying the rotational speed of the output shaft O by the speed ratio of the lower shift speed.

In the embodiment, the during-regeneration downshift control section 41 sets a target decrease speed DW2, which is a target value of the decrease speed of the difference rotational speed W1, in accordance with the difference rotational speed W1. The during-regeneration downshift control section 41 decreases the target decrease speed DW2 of the difference rotational speed W1 as the difference rotational speed W1 decreases in accordance with a map as shown in FIG. 4. Then, the during-regeneration downshift control section 41 performs feedback control of the transfer torque capacity of the engagement-side element such that the actual decrease speed of the difference rotational speed W1 becomes the target decrease speed DW2. The during-regeneration downshift control section 41 performs feedback control in which the target transfer torque capacity Tc is decreased in the case where the actual decrease speed is higher than the target decrease speed DW2, and in which the target transfer torque capacity Tc is increased in the case where the actual decrease speed is lower than the target decrease speed DW2. In the feedback control, as the difference rotational speed W1 decreases, the excessive torque is decreased to be close to zero, and the target transfer torque capacity is decreased to be close to the magnitude of the engagement-side input torque Tie. Here, because the vehicle is decelerating, the excessive torque at the time when the difference rotational speed W1 has become zero is slightly larger than zero by the amount corresponding to the decrease speed of the rotational speed of the output shaft O, and the target transfer torque capacity is accordingly slightly larger than the magnitude of the engagement-side input torque Tie.

After the rotational speed of the input member of the engagement-side element and the rotational speed of the output member of the engagement-side element are synchronized with each other (at and after time t16), the during-regeneration downshift control section 41 performs control for increasing the transfer torque capacity of the engagement-side element to a complete engagement capacity.

First, the during-regeneration downshift control section 41 determines whether or not the rotational speed of the intermediate shaft M and the target input rotational speed at the lower shift speed have been synchronized with each other. The during-regeneration downshift control section 41 determines that synchronization has been achieved in the case where the difference rotational speed W1 and the decrease speed of the difference rotational speed W1 have become sufficiently low. In the embodiment, it is determined that a synchronization has been achieved when the difference rotational speed W1 has become a predetermined value or less and the acceleration of the difference rotational speed ΔW has become a predetermined value or less (time t16).

In the case where it is determined that a synchronization has been achieved, the during-regeneration downshift control section 41 gradually increases the target transfer torque capacity Tc of the engagement-side element to the complete engagement capacity. In the embodiment, the complete engagement capacity is set to be sufficiently large so that there is no difference in rotational speed (slipping) between the input and output members of the engagement-side element even if torque input from the rotary electric machine MG or the engine E is increased. After it is determined that a synchronization has been achieved, the during-regeneration downshift control section 41 increases the target transfer torque capacity Tc of the engagement-side element at a third gradient (time t16 to time t17), and thereafter increases the target transfer torque capacity Tc of the engagement-side element stepwise to the complete engagement capacity (time t17). The during-regeneration downshift control section 41 converts the target transfer torque capacity Tc of the engagement-side element into a target hydraulic pressure on the basis of the characteristics map of the engagement-side element, and supplies working oil at the target hydraulic pressure to the engagement-side element via the hydraulic control device PC. Since the transfer torque capacity is gradually increased for a while in this way, the difference rotational speed ΔW is decreased to zero, even if there is a difference rotational speed ΔW, in the case where synchronization is achieved. Thus, fluctuations in transfer torque of the engagement-side element that occur when the engagement-side element is transitioned to the completely engaged state can be made gentle, suppressing generation of a torque shock.

After the target transfer torque capacity Tc is increased to the complete engagement capacity (time t17), the during-regeneration downshift control section 41 transitions the control phase from the inertia control phase to the normal control phase to terminate the during-regeneration downshift control.

Figure 5A:
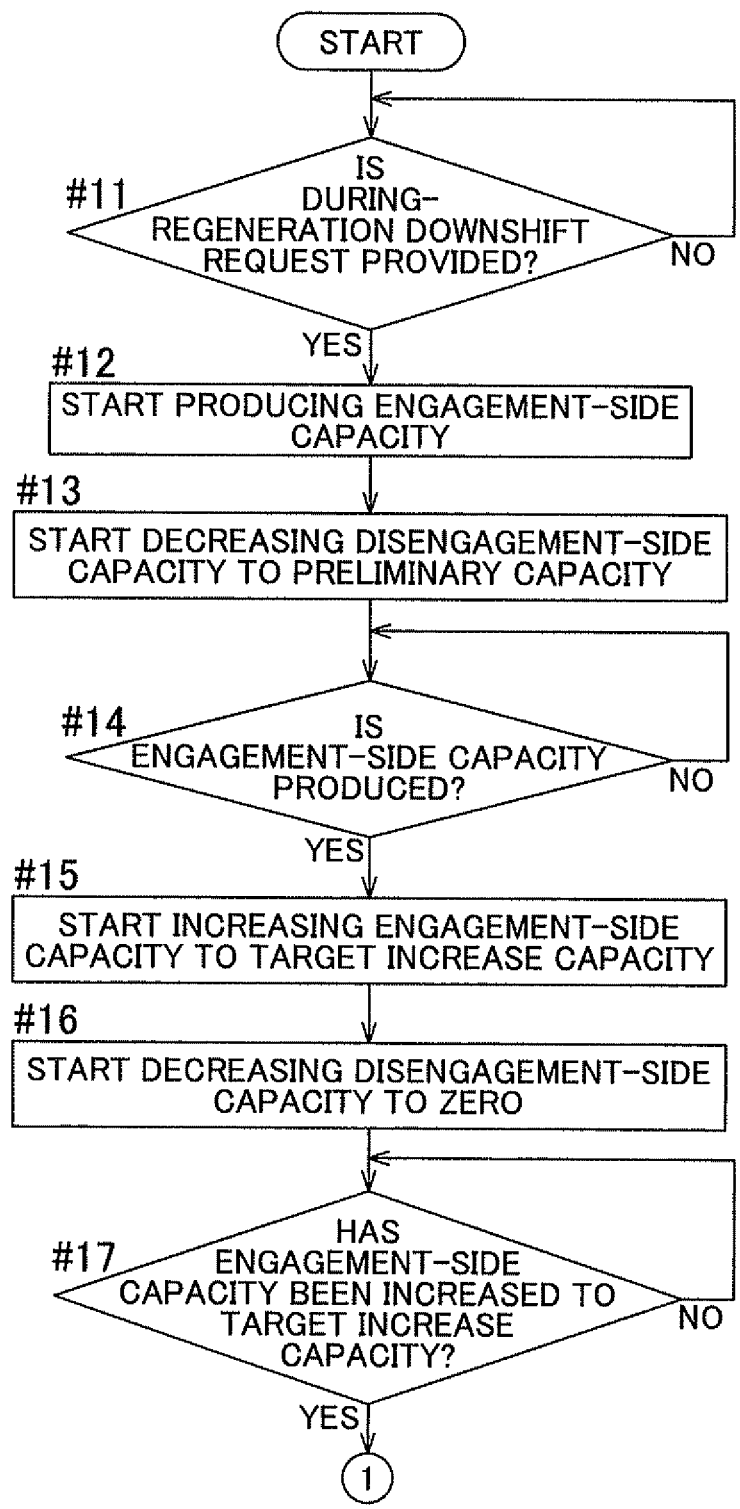
FIGS. 5A and 5B are flowcharts showing the process performed by the control device according to the embodiment of the present invention.
Figure 5B:
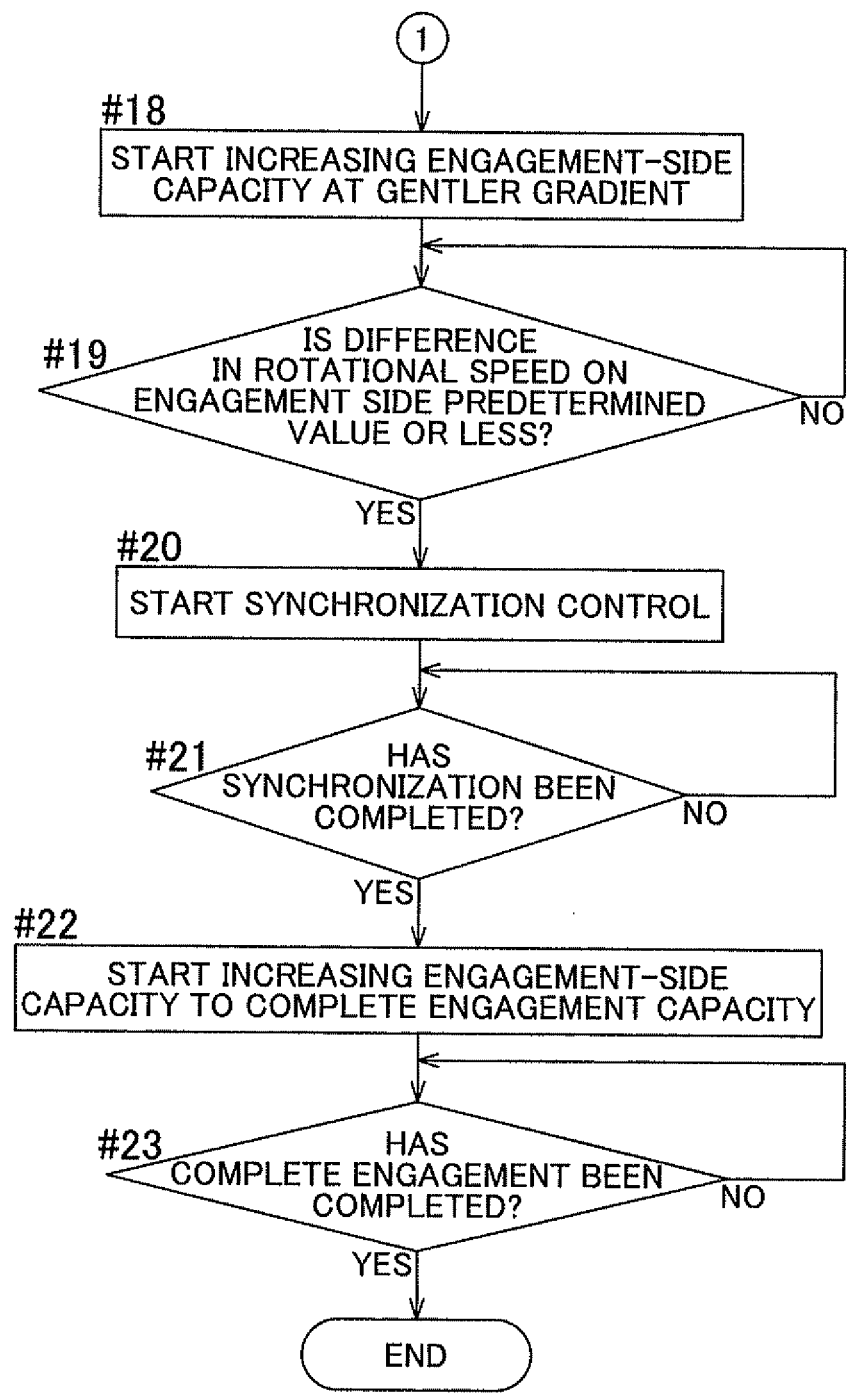

3-6-4. Procedures of Control Processes Performed by During-Regeneration Downshift Control Section Next, control processes performed by the during-regeneration downshift control section 41 will be described with reference to the flowchart of FIGS. 5A and 5B. FIGS. 5A and 5B are flowcharts showing the procedures of control processes for controlling the transfer torque capacity of the engagement-side element and the disengagement-side element in the during-regeneration downshift control.

First, in the case where a during-regeneration downshift request is provided (step #11: Yes), the during-regeneration downshift control section 41 starts processes of the during-regeneration downshift control, and starts control for supplying working oil at a predetermined engagement-side preliminary pressure to the engagement-side element in order for the engagement-side element to start producing the transfer torque capacity (step #12) as described above. Subsequently, the during-regeneration downshift control section 41 starts control for decreasing the transfer torque capacity of the disengagement-side element to the disengagement-side preliminary capacity set in accordance with the regenerative torque Tg (step #13) as described above. Thereafter, in the case where it is determined that the engagement-side element starts producing the transfer torque capacity (step #14: Yes) as described above, the during-regeneration downshift control section 41 starts control for setting the target increase capacity Tf in accordance with the regenerative torque Tg and increasing the transfer torque capacity of the engagement-side element to the target increase capacity Tf over a predetermined torque capacity increase period (step #15). At the same time, the during-regeneration downshift control section 41 starts control for decreasing the transfer torque capacity of the disengagement-side element from the disengagement-side preliminary capacity over a predetermined torque capacity decrease period (step #16). Thereafter, in the case where the transfer torque capacity of the engagement-side element is increased to the target increase capacity Tf (step #17: Yes) as described above, the during-regeneration downshift control section 41 starts control for increasing the transfer torque capacity of the engagement-side element from the target increase capacity Tf at a gentler gradient (step #18). Thereafter, in the case where the difference in rotational speed between the input and output members of the engagement-side element has become a predetermined value or less (step #19: Yes) as described above, the during-regeneration downshift control section 41 starts control for varying the transfer torque capacity of the engagement-side element such that the rotational speed of the input member of the engagement-side element and the rotational speed of the output member of the engagement-side element are synchronized with each other while decreasing the decrease speed of the difference in rotational speed (step #20). Thereafter, in the case where the respective rotational speeds of the input and output members of the engagement-side element are synchronized with each other (step #21: Yes) as described above, the during-regeneration downshift control section 41 starts control for increasing the transfer torque capacity of the engagement-side element to the complete engagement capacity (step #22). Thereafter, in the case where the transfer torque capacity of the engagement-side element is increased to the complete engagement capacity (step #23: Yes), the during-regeneration downshift control section 41 terminates the processes of the during-regeneration downshift control.

[Other Embodiments]

Lastly, other embodiments of the present invention will be described. The configuration of each of the embodiments described below is not limited to their independent applications, and may be applied in combination with the configuration of other embodiments unless any contradiction occurs.

(1) In the embodiment described above, the target increase capacity Tf is set to the magnitude of the engagement-side input torque Tie, which is the minimum transfer torque capacity with which all the engagement-side input torque Tie can be transferred to the wheels W through friction between the input and output members of the engagement-side element. However, the present invention is not limited thereto. That is, the target increase capacity Tf may be set on the basis of the magnitude of the engagement-side input torque Tie. For example, in one preferred embodiment of the present invention, the target increase capacity Tf is set to a value increased or decreased from the magnitude of the engagement-side input torque Tie by a predetermined value.

(2) In the above embodiment, the torque capacity decrease period coincides with the torque capacity increase period. However, the present invention is not limited thereto. That is, the timing to start the torque capacity decrease period may be set not to coincide with the timing to start the torque capacity increase period. Also, the timing to terminate the torque capacity decrease period may be set not to coincide with the timing to terminate the torque capacity increase period. Alternatively, both the timings to start and terminate the torque capacity decrease period may not coincide with the timings to start and terminate the torque capacity increase period, respectively. In any case, the torque capacity decrease period and the torque capacity increase period should be set to at least partially overlap each other.

(3) In the embodiment described above, in the torque control phase, the engagement-side distribution ratio A is increased from 0.0 to 1.0 at the first gradient and the disengagement-side distribution ratio B is decreased from 1.0 to 0.0 at the first gradient so that the transfer torque capacity of the engagement-side element is increased at a constant gradient and the transfer torque capacity of the disengagement-side element is decreased at a constant gradient. However, the present invention is not limited thereto. That is, in one preferred embodiment of the present invention, the engagement-side distribution ratio A is increased from 0.0 to 1.0 along a desired waveform, and the disengagement-side distribution ratio B is decreased from 1.0 to 0.0 along a desired waveform. Also in this case, the total value of the engagement-side distribution ratio A and the disengagement-side distribution ratio B may be set to 1.0.

Alternatively, the engagement-side distribution ratio A may be increased from 0.0 to 1.0 and the disengagement-side distribution ratio B may be decreased from 1.0 to 0.0 such that the total value of the engagement-side distribution ratio A and the disengagement-side distribution ratio B does not equal 1.0.

(4) In the embodiment described above, before the start of the torque capacity decrease period, the transfer torque capacity of the disengagement-side element is decreased to the transfer torque capacity which is larger by a predetermined value than the minimum transfer torque capacity with which the speed change mechanism TM transfers all the regenerative torque to the wheels W. However, the present invention is not limited thereto. That is, in one preferred embodiment of the present invention, the predetermined value is zero, in other words, before the start of the torque capacity decrease period, the transfer torque capacity of the disengagement-side element is decreased to the minimum transfer torque capacity with which the speed change mechanism TM transfers all the regenerative torque to the wheels W.

(5) In the embodiment described above, after the difference rotational speed W1 becomes the predetermined value ΔW or less, feedback control is performed so as to synchronize the rotational speed of the intermediate shaft M and the target input rotational speed at the lower shift speed with each other while decreasing the target decrease speed DW2 of the difference rotational speed W1. However, the present invention is not limited thereto. That is, in one preferred embodiment of the present invention, after the difference rotational speed W1 becomes the predetermined value ΔW or less, feedback control is not performed, but the transfer torque capacity of the engagement-side element is decreased to the magnitude of the engagement-side input torque Tie at a predetermined gradient as the behavior indicated in FIG. 3. In this case, control for increasing the transfer torque capacity of the engagement-side element to the complete engagement capacity may be started at the timing when the transfer torque capacity of the engagement-side element has decreased to the magnitude of the engagement-side input torque Tie. Also with this configuration, excessive torque can be decreased as the difference rotational speed W1 decreases to decrease the target decrease speed DW2 of the difference rotational speed W1. Also in this case, the transfer torque capacity of the engagement-side element is preferably varied in accordance with the amount of variation in magnitude of the engagement-side input torque Tie to achieve behavior indicated by the broken line in FIG. 3.

(6) In the embodiment described above, after the start of the inertia control phase, the transfer torque capacity of the engagement-side element is increased at a predetermined gradient until the difference rotational speed W1 becomes the predetermined value ΔW or less. However, the present invention is not limited thereto. That is, in one preferred embodiment of the present invention, after the start of the inertia control phase, the difference rotational speed W1 is decreased while increasing the target decrease speed DW2 of the difference rotational speed W1 until the difference rotational speed W1 becomes the predetermined value ΔW or less. In this case, feedback control may be performed. The feedback control may be performed by setting the target decrease speed DW2 in accordance with the difference rotational speed W1 using a map as shown in FIG. 4 and varying the transfer torque capacity of the engagement-side element such that the actual decrease speed coincides with the target decrease speed DW2.

(7) In the embodiment described above, in the inertia control phase, the target transfer torque capacity Tc of the engagement-side element is increased and decreased in accordance with variations in regenerative torque Tg as indicated by the broken line at and after time t14 of FIG. 3. However, the present invention is not limited thereto. That is, the target transfer torque capacity Tc of the engagement-side element may be varied in accordance with variations in regenerative torque Tg in a period over which the during-regeneration downshift is executed. For example, in one preferred embodiment of the present invention, the target transfer torque capacity Tc of the engagement-side element may be varied in accordance with variations in regenerative torque Tg based on the formula (4) in the torque control phase.

Also, the target transfer torque capacity of the disengagement-side element may be varied in accordance with variations in regenerative torque Tg, as with the target transfer torque capacity of the engagement-side element, in a period over which the during-regeneration downshift is executed. For example, in one preferred embodiment of the present invention, the target transfer torque capacity Tr of the disengagement-side element may be varied in accordance with variations in regenerative torque Tg based on the formula (5) in the torque control phase.

(8) In the embodiment described above, the during-regeneration downshift control section 41 calculates the respective target transfer torque capacities Tc and Tr of the engagement-side element and the disengagement-side element, converts the target transfer torque capacities Tc and Tr into a target hydraulic pressure on the basis of the respective characteristics maps of the engagement-side element and the disengagement-side element, and supplies working oil at the target hydraulic pressure. Thus, when a during-regeneration downshift is performed by controlling engagement and disengagement of the plurality of friction engagement elements while the rotary electric machine MG is outputting the regenerative torque Tg, the control device 31 substantially executes control for setting a target increase hydraulic pressure Pf, which is a target value of the hydraulic pressure of the engagement-side element after an increase, in accordance with the regenerative torque Tg, increasing the hydraulic pressure of the engagement-side element to the target increase hydraulic pressure Pf over a predetermined hydraulic pressure increase period (torque capacity increase period), and decreasing the hydraulic pressure of the disengagement-side element over a predetermined hydraulic pressure decrease period (torque capacity decrease period) that at least partially overlaps the hydraulic pressure increase period. However, the embodiment of the present invention is not limited thereto. For example, the during-regeneration downshift control section 41 may be configured to directly calculate the target hydraulic pressure of the engagement-side element and the disengagement-side element, without computing the target transfer torque capacities Tc and Tr serving as intermediate variables, and to supply working oil at the target hydraulic pressure.

In this case, the during-regeneration downshift control section 41 may be configured to set the target increase hydraulic pressure Pf, which is a target value of the hydraulic pressure of the engagement-side element after an increase, in accordance with the regenerative torque Tg and to increase the hydraulic pressure of the engagement-side element to the target increase hydraulic pressure Pf over a predetermined hydraulic pressure increase period when a during-regeneration downshift is performed. For example, the during-regeneration downshift control section 41 is configured to convert a value obtained by multiplying the magnitude of the regenerative torque Tg by the engagement-side transfer ratio Re into the target increase hydraulic pressure Pf on the basis of a characteristics map Fc( ) of the engagement-side element as given by the following formula, in place of the formulas (2) and (3).

$$Pf = Fc(|Tg| \times Re) \quad (7)$$

Then, the during-regeneration downshift control section 41 increases a target hydraulic pressure Pc of the engagement-side element to the target increase hydraulic pressure Pf over a predetermined hydraulic pressure increase period (torque capacity increase period), and decreases a target hydraulic pressure Pr of the disengagement-side element over a predetermined hydraulic pressure decrease period (torque capacity decrease period) that at least partially overlaps the hydraulic pressure increase period (the torque capacity increase period). For example, the during-regeneration downshift control section 41 sets the target hydraulic pressure Pc of the engagement-side element using the engagement-side distribution ratio A described above as given by the following formula, in place of the formula (4).

$$Pc=Pf \times A \quad (8)$$

Also, the during-regeneration downshift control section 41 sets the target hydraulic pressure Pr of the disengagement-side element using a characteristics map Fr( ) of the disengagement-side element and the disengagement-side distribution ratio B described above as given by the following formula, in place of the formula (5).

$$Pr=Fr(|Tg| \times Rf) \times B \quad (9)$$

In this case, the during-regeneration downshift control section 41 may be configured to gradually increase the target hydraulic pressure Pc of the engagement-side element from the target increase hydraulic pressure Pf at the second gradient set to be smaller in magnitude than the first gradient after the start of the inertia control phase. For example, the during-regeneration downshift control section 41 sets the target hydraulic pressure Pc of the engagement-side element to a value obtained by adding to the target increase hydraulic pressure Pf a value obtained by multiplying the second gradient K2 and the time T2 having elapsed after the start of the inertia control phase as given by the following formula, in place of the formula (6).

$$Pc=Pf+K2 \times T2 \quad (10)$$

Here, the target increase hydraulic pressure Pf may be calculated in accordance with the regenerative torque Tg at all times during the during-regeneration downshift control so that variations in regenerative torque Tg are reflected in the target hydraulic pressure Pc on the basis of the formulas (8) and (10).

Also, the during-regeneration downshift control section 41 may be configured to perform feedback control of the target hydraulic pressure Pc of the engagement-side element, in place of the transfer torque capacity of the engagement-side element, on the basis of the difference rotational speed W1 after the difference rotational speed W1 becomes the predetermined value ΔW or less.

Then, the during-regeneration downshift control section 41 may be configured to increase the target hydraulic pressure Pc of the engagement-side element to the complete engagement hydraulic pressure after the input and output members of the engagement-side element are synchronized with each other. The complete engagement hydraulic pressure is set to be sufficiently large so that there is no difference in rotational speed (slipping) between the input and output members of the engagement-side element even if torque input from the rotary electric machine MG or the engine E is increased.

The present invention may be suitably applied to a vehicle transmission device including an input member drivably coupled to an internal combustion engine and a rotary electric machine, an output member drivably coupled to wheels, a speed change mechanism that provides a plurality of shift speeds established by controlling engagement and disengagement of a plurality of friction engagement elements, and a control device that controls the speed change mechanism.

What is claimed is:

1. A vehicle transmission device, comprising:
   an input member drivably coupled to an internal combustion engine and a rotary electric machine;
   an output member drivably coupled to wheels;
   a speed change mechanism that includes a plurality of friction engagement elements and that provides a plurality of shift speeds established by controlling engagement and disengagement of the plurality of friction engagement elements; and
   a control device that controls the speed change mechanism, wherein
   when a during-regeneration downshift is performed by controlling engagement and disengagement of the friction engagement elements while the rotary electric machine is outputting regenerative torque, the control device sets a target increase capacity, which is a target value of a transfer torque capacity of an engagement-side element which is a friction engagement element to be engaged after an increase, in accordance with the regenerative torque, increases the transfer torque capacity of the engagement-side element to the target increase capacity over a predetermined torque capacity increase period, and decreases a transfer torque capacity of a disengagement-side element, which is a friction engagement element to be disengaged, over a predetermined torque capacity decrease period that at least partially overlaps the torque capacity increase period such that the regenerative torque is transferred to the wheels through either both or one of the engagement-side element and the disengagement-side element even during the during-regeneration downshift.

2. The vehicle transmission device according to claim 1, wherein
   engagement and disengagement of the friction engagement elements are controlled by a hydraulic pressure of working oil supplied to the friction engagement elements, and the transfer torque capacity is continuously controlled so as to increase and decrease by controlling the hydraulic pressure.

3. The vehicle transmission device according to claim 1, wherein
   in the case where the disengagement-side element is disengaged, the control device sets the target increase capacity of the engagement-side element to a minimum transfer torque capacity with which the speed change mechanism transfers all the regenerative torque to the output member.

4. The vehicle transmission device according to claim 2, wherein
   in the case where the disengagement-side element is disengaged, the control device sets the target increase capacity of the engagement-side element to a minimum transfer torque capacity with which the speed change mechanism transfers all the regenerative torque to the output member.

5. The vehicle transmission device according to claim 1, wherein
   the control device synchronizes a timing to start the predetermined torque capacity decrease period with a timing to start the predetermined torque capacity increase period.

6. The vehicle transmission device according to claim 1, wherein
   the control device synchronizes a timing to terminate the predetermined torque capacity decrease period with a timing to terminate the predetermined torque capacity increase period.

7. The vehicle transmission device according to claim 1, wherein
   before start of the predetermined torque capacity decrease period, the control device decreases the transfer torque capacity of the disengagement-side element to a transfer torque capacity which is larger by a predetermined value than the minimum transfer torque capacity with which the speed change mechanism transfers all the regenerative torque to the output member.

8. The vehicle transmission device according to claim 1, wherein
   after termination of the predetermined torque capacity increase period, the control device increases the transfer torque capacity of the engagement-side element from the target increase capacity at a gentler gradient than in the predetermined torque capacity increase period so that a difference in rotational speed between input and output members of the engagement-side element is decreased, and after the difference in rotational speed for the engagement-side element has become a predetermined value or less, the control device varies the transfer torque capacity of the engagement-side element such that the respective rotational speeds of the input and output members of the engagement-side element are synchronized with each other while decreasing a decrease speed of the difference in rotational speed for the engagement-side element.

9. The vehicle transmission device according to claim 1, wherein
the control device varies the transfer torque capacity of the engagement-side element in accordance with variations in the regenerative torque.

10. A vehicle transmission device, comprising:
an input member drivably coupled to an internal combustion engine and a rotary electric machine;
an output member drivably coupled to wheels;
a speed change mechanism that includes a plurality of friction engagement elements controlled by a hydraulic pressure of supplied working oil and that provides a plurality of shift speeds established by controlling engagement and disengagement of the plurality of friction engagement elements; and
a control device that controls the speed change mechanism, wherein
when a during-regeneration downshift is performed by controlling engagement and disengagement of the friction engagement elements while the rotary electric machine is outputting regenerative torque, the control device sets a target increase hydraulic pressure, which is a target value of a hydraulic pressure of an engagement-side element which is a friction engagement element to be engaged after an increase, in accordance with the regenerative torque, increases the hydraulic pressure of the engagement-side element to the target increase hydraulic pressure over a predetermined hydraulic pressure increase period, and decreases a hydraulic pressure of a disengagement-side element, which is a friction engagement element to be disengaged, over a predetermined hydraulic pressure decrease period that at least partially overlaps the hydraulic pressure increase period such that the regenerative torque is transferred to the wheels through either both or one of the engagement-side element and the disengagement-side element even during the during-regeneration downshift.

11. A vehicle transmission device, comprising:
an input member drivably coupled to an internal combustion engine and a rotary electric machine;
an output member drivably coupled to wheels;
a speed change mechanism that includes a plurality of friction engagement elements and that provides a plurality of shift speeds established by controlling engagement and disengagement of the plurality of friction engagement elements; and
a control device that controls the speed change mechanism, wherein
when a during-regeneration downshift is performed by controlling engagement and disengagement of the friction engagement elements while the rotary electric machine is outputting regenerative torque, the control device sets a target increase capacity, which is a target value of a transfer torque capacity of an engagement-side element which is a friction engagement element to be engaged after an increase, in accordance with the regenerative torque, increases the transfer torque capacity of the engagement-side element to the target increase capacity over a predetermined torque capacity increase period, and decreases a transfer torque capacity of a disengagement-side element, which is a friction engagement element to be disengaged, over a predetermined torque capacity decrease period that at least partially overlaps the torque capacity increase period, and
before start of the predetermined torque capacity decrease period, the control device decreases the transfer torque capacity of the disengagement-side element to a transfer torque capacity which is larger by a predetermined value than the minimum transfer torque capacity with which the speed change mechanism transfers all the regenerative torque to the output member.

12. A vehicle transmission device, comprising:
an input member drivably coupled to an internal combustion engine and a rotary electric machine;
an output member drivably coupled to wheels;
a speed change mechanism that includes a plurality of friction engagement elements and that provides a plurality of shift speeds established by controlling engagement and disengagement of the plurality of friction engagement elements; and
a control device that controls the speed change mechanism, wherein
when a during-regeneration downshift is performed by controlling engagement and disengagement of the friction engagement elements while the rotary electric machine is outputting regenerative torque, the control device sets a target increase capacity, which is a target value of a transfer torque capacity of an engagement-side element which is a friction engagement element to be engaged after an increase, in accordance with the regenerative torque, increases the transfer torque capacity of the engagement-side element to the target increase capacity over a predetermined torque capacity increase period, and decreases a transfer torque capacity of a disengagement-side element, which is a friction engagement element to be disengaged, over a predetermined torque capacity decrease period that at least partially overlaps the torque capacity increase period, and
after termination of the predetermined torque capacity increase period, the control device increases the transfer torque capacity of the engagement-side element from the target increase capacity at a gentler gradient than in the predetermined torque capacity increase period so that a difference in rotational speed between input and output members of the engagement-side element is decreased, and after the difference in rotational speed for the engagement-side element has become a predetermined value or less, the control device varies the transfer torque capacity of the engagement-side element such that the respective rotational speeds of the input and output members of the engagement-side element are synchronized with each other while decreasing a decrease speed of the difference in rotational speed for the engagement-side element.

* * * * *